United States Patent
Krasovic

(10) Patent No.: US 11,208,728 B2
(45) Date of Patent: *Dec. 28, 2021

(54) ELECTROLYSIS CELL OF ALKALI SOLUTIONS

(71) Applicant: INDUSTRIE DE NORA S.p.A., Milan (IT)

(72) Inventor: Julia Lynne Krasovic, Fairport Harbor, OH (US)

(73) Assignee: INDUSTRIE DE NORA S.P.A, Milan (IT)

(*) Notice: Subject to any disclaimer, the term of this patent is extended or adjusted under 35 U.S.C. 154(b) by 300 days.

This patent is subject to a terminal disclaimer.

(21) Appl. No.: 14/902,376

(22) PCT Filed: Jul. 15, 2014

(86) PCT No.: PCT/EP2014/065097
§ 371 (c)(1),
(2) Date: Dec. 31, 2015

(87) PCT Pub. No.: WO2015/007716
PCT Pub. Date: Jan. 22, 2015

(65) Prior Publication Data
US 2016/0369412 A1 Dec. 22, 2016

Related U.S. Application Data

(60) Provisional application No. 61/847,255, filed on Jul. 17, 2013.

(51) Int. Cl.
C25B 1/04 (2021.01)
C25B 9/73 (2021.01)
(Continued)

(52) U.S. Cl.
CPC .............. *C25B 1/04* (2013.01); *C25B 9/23* (2021.01); *C25B 9/73* (2021.01); *C25B 11/031* (2021.01);
(Continued)

(58) Field of Classification Search
CPC ............ C25B 1/00–46; C25B 3/00–12; C25B 9/06–10; C25B 11/00–14;
(Continued)

(56) References Cited

U.S. PATENT DOCUMENTS 4,305,793 A * 12/1981 Broniewski ............... C25B 1/46
204/263
4,465,570 A * 8/1984 Oda ......................... C25B 1/10
204/283

(Continued)

FOREIGN PATENT DOCUMENTS

| EP | 0928036 A1 | 7/1999 | |
|---|---|---|---|
| WO | WO-2005012596 A1 * | 2/2005 | ............... C25B 9/19 |
| WO | 2014060417 A1 | 4/2014 | |

OTHER PUBLICATIONS

Nafion 117 (Nafion 117 product bulletin, FuelCellStore 2016, URL: http://www.fuelcellstore.com/spec-sheets/chemours-nafion-115-117-1110-spec-sheet.pdf, downloaded Mar. 29, 2018). (Year: 2016).*

(Continued)

*Primary Examiner* — Joshua L Allen
(74) *Attorney, Agent, or Firm* — Lucas & Mercanti, LLP

(57) ABSTRACT

The invention relates to an electrochemical cell partitioned by a cation-exchange membrane suitable for production of high purity hydrogen and oxygen by electrolysis of alkaline solutions comprising a cathode in form of porous web including a platinum or palladium catalyst. The cell can be used as an element of a modular filter-press electrolyzer.

8 Claims, 1 Drawing Sheet

(51) Int. Cl.
*C25B 9/23* (2021.01)
*C25B 11/031* (2021.01)
*C25B 11/081* (2021.01)
*H01M 4/92* (2006.01)
*H01M 4/86* (2006.01)

(52) U.S. Cl.
CPC ......... *C25B 11/081* (2021.01); *H01M 4/8657* (2013.01); *H01M 4/92* (2013.01); *Y02E 60/36* (2013.01)

(58) Field of Classification Search
CPC ........... C25B 11/0436; C25B 39/06–10; C25B 39/10; C25B 1/08; C25B 9/10; C25B 11/0473; C25B 11/035; Y02E 60/36–366; Y02E 60/366; H01M 4/86–8657; H01M 4/8647; H01M 4/8657; H01M 4/92
See application file for complete search history.

(56) References Cited

U.S. PATENT DOCUMENTS

| | | | | |
|---|---|---|---|---|
| 5,316,643 A * | 5/1994 | Ahn | ................... | H01M 4/8615 204/265 |
| 5,676,808 A * | 10/1997 | Nishiki | ................... | C25B 9/08 204/252 |
| 6,024,855 A * | 2/2000 | Sharifian | ................ | B01D 61/52 204/522 |
| 6,488,833 B1 * | 12/2002 | Sakata | ................... | C25B 1/46 205/515 |
| 2002/0037446 A1 * | 3/2002 | Iyer | ................... | H01M 8/1009 429/417 |
| 2003/0017379 A1 * | 1/2003 | Menashi | ................. | H01M 4/96 502/185 |
| 2005/0106450 A1 * | 5/2005 | Castro | ................... | C25B 11/035 429/480 |
| 2008/0187795 A1 * | 8/2008 | Highgate | ................ | H01M 8/22 429/421 |
| 2008/0264780 A1 * | 10/2008 | Kato | ........................ | C25B 1/04 204/252 |
| 2009/0152118 A1 * | 6/2009 | Sugimasa | ................ | C25B 1/06 205/80 |
| 2012/0085657 A1 * | 4/2012 | Bhavaraju | ................ | C25B 1/26 205/351 |
| 2012/0175268 A1 * | 7/2012 | Joshi | ........................ | C25B 1/04 205/412 |
| 2012/0305388 A1 * | 12/2012 | Cowan | ..................... | C25B 1/06 204/257 |
| 2014/0183054 A1 * | 7/2014 | Legzdins | ................ | C02F 1/461 205/343 |

OTHER PUBLICATIONS

Bulan et al. (WO 2005/012596 A1, machine translation) (Year: 2005).*
International Search Report based on International Application No. PCT/EP2014/065097, dated Oct. 1, 2014. (3 pages).

* cited by examiner

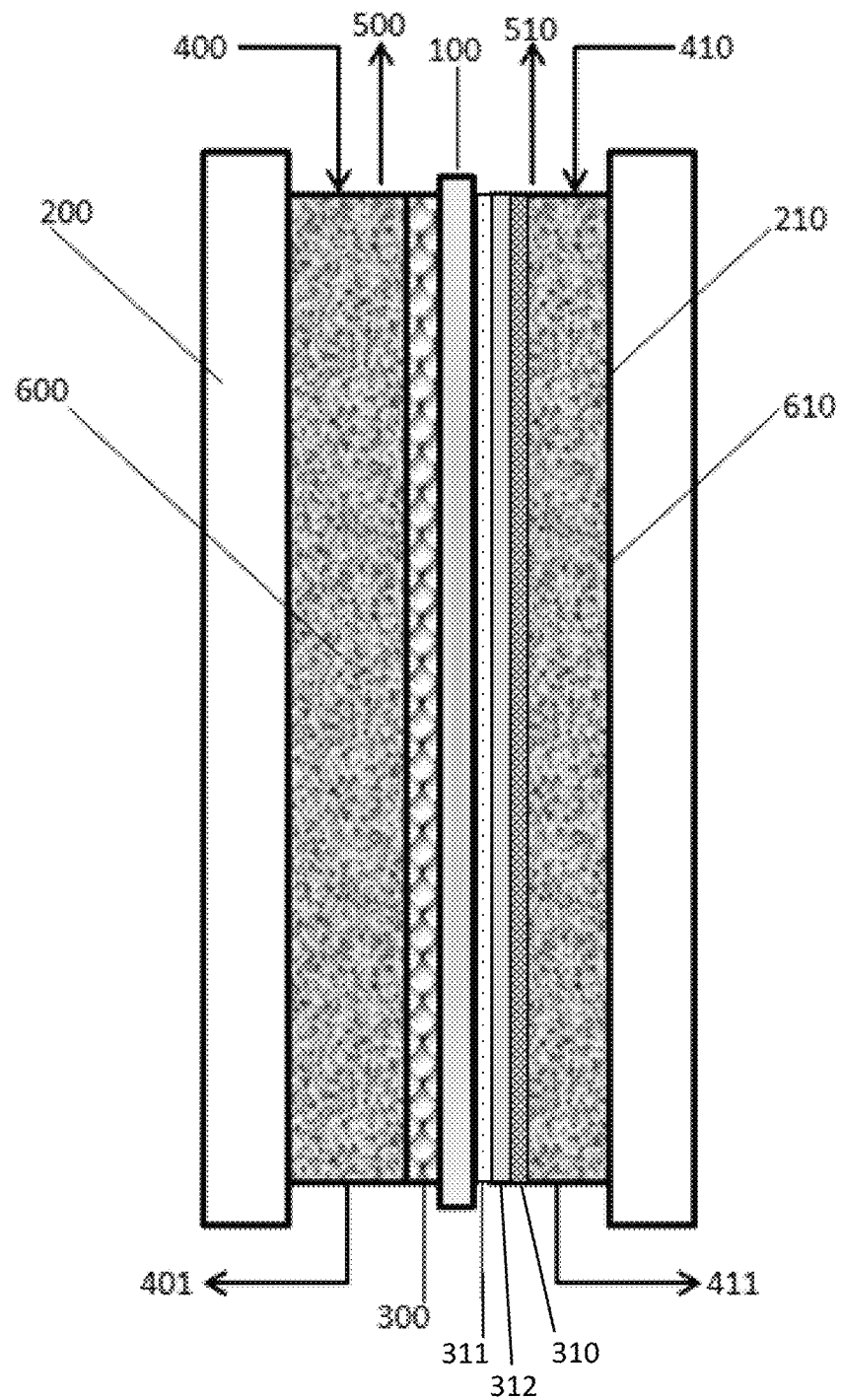

ELECTROLYSIS CELL OF ALKALI SOLUTIONS

CROSS-REFERENCE TO RELATED APPLICATIONS

This application is a U.S. national stage of PCT/EP2014/065097 filed on Jul. 15, 2014 which claims the benefit of priority of U.S. Application No. 61/847,255 filed on Jul. 17, 2013, the contents of each of which are incorporated herein by reference.

FIELD OF THE INVENTION

The invention relates to an electrochemical cell, with particular reference to a caustic soda or potash electrolysis cell with cathodic production of hydrogen and anodic production of oxygen.

BACKGROUND OF THE INVENTION

Production of hydrogen and oxygen by electrolysis of aqueous solutions is widely known in the art. Technologies based on electrolysis of either acidic or alkaline solutions were employed in the past, the latter being largely preferred due to the lesser aggressiveness of electrolytes, allowing a wider selection of metallic materials for their manufacturing. The electrolysis of alkali solutions, such as caustic soda or potash, is practiced in cells partitioned by semipermeable diaphragms at atmospheric pressure since seventy years on an industrial scale. As it is well known, commonly used diaphragms present severe limitations in terms of process conditions, being unsuitable for pressurised operation in safety conditions and for high current density operation, for instance above 3 kA/m$^2$. In addition, for the sake of simplifying the process, the electrolyte at the outlet of the cathodic compartment, whose pH would tend to increase under the effect of the cathodic reaction, has to be blended with the electrolyte at the outlet of the anodic compartment, whose pH conversely tends to decrease, prior to being recycled to the cell. Hydrogen and oxygen dissolved in these two outlet flows, albeit in a limited amount, end up mixing, thereby diminishing the purity of the final products: from a commercial standpoint this is considered particularly critical for product hydrogen. The typical purity of hydrogen produced in diaphragm alkaline electrolyzers, measured in terms of concentration of oxygen in the dried cathodic product, ranges around 0.5% $O_2$ content (5000 ppm).

In the attempt of overcoming such limitations, a generation of electrolytic cells called "PEM" or "SPE" (respectively from "Proton Exchange Membrane" or "Solid Polymer Electrolyte") capable of electrolysing pure water was developed at a later time, based on the use of ion-exchange membranes, suitably catalysed on the two faces, to separate two compartments consisting of gas chambers; ion-exchange membranes are in fact capable of withstanding pressure differentials of a few bars and can be operated at much higher current density, which in extreme cases may reach values around 25 kA/m$^2$. Purity of hydrogen obtainable with this type of cells ranges around 400-700 ppm of $O_2$ in the dried cathodic product. Also PEM/SPE cells nevertheless present some important drawbacks, especially associated with difficulties in designing big size cells in the absence of a highly conductive electrolyte capable of compensating for the constructive tolerances and preserving local electrical continuity. For this reason, it is generally considered that the maximum power which can be installed for this kind of technology is in the order of few kW.

There has thus been identified the need of providing an electrolytic technology for production of hydrogen and oxygen overcoming the limitations of the prior art, coupling a high purity of products with the capability of operating at high current density on a large scale.

SUMMARY OF THE INVENTION

Various aspects of the invention are set out in the accompanying claims.

Under one aspect, the invention relates to a cell for electrolysis of alkali solutions partitioned by a cation-exchange membrane into an anodic compartment and a cathodic compartment fed with an alkaline electrolyte, typically caustic soda or potash, the anodic compartment containing an anode suitable for oxygen evolution and the cathodic compartment containing a cathode for hydrogen evolution; the cathode is obtained from a porous web in intimate contact with the membrane through a catalytically active layer containing at least one metal selected between platinum and palladium. Cathodic structures of this kind are sometimes used as gas-diffusion cathodes wherein the porous web, suitable for gas transport and usually obtained from carbonaceous or metallic materials, is normally provided with one or more diffusive layers consisting of metal or carbon powders in admixture with optionally sintered polymer binders; such layers or part of them may be suitably catalysed. When used as gas-diffusion cathode, this kind of electrode is fed with gaseous reactants, for instance to achieve the reduction of oxygen in fuel cells or in depolarised electrolysis cells. Inventors have nevertheless observed that this kind of electrode architecture is particularly suitable for obtaining hydrogen at extremely high purity by cathodic evolution in caustic soda or potash electrolysis processes.

The surprising performances of electrodes of this kind when flooded in a liquid compartment rather than arranged in gas chamber can be further improved by conferring suitable characteristics of relative hydrophilicity to the catalysed layer in contact with the membrane as well as to the layers in contact with the starting porous web. The hydrophilicity or hydrophobicity degree of diffusive layers can be adjusted by acting on the ratio of hydrophilic (for instance carbonaceous or metal powders) to hydrophobic components (for instance polymer binders); a suitable selection of different carbon powders may also be used to adjust hydrophilicity of electrode layers. Different formulation of catalytically active layers were tested by inventors, for instance making use of different mixtures of noble metals, obtaining in some cases similar cell voltages to those provided by platinum and/or palladium-based catalysts. The latter however have shown absolutely superior performances in terms of purity of product hydrogen.

In the cell according to the invention an alkaline electrolyte, for instance caustic soda or potash, is circulated by means of suitable feed and discharge means in the two compartments of the cell; in one embodiment, the same concentration of alkaline electrolyte solution is maintained in the anodic and in the cathodic compartment. This can have the advantage of minimising the electrolyte migration from one compartment to the other across the cation-exchange membrane, which although acting as hydraulic separator is still subject to permeation of water as solvation sphere of transported ions, possibly along with small amounts of anodically-produced oxygen that might pollute cathodically-produced hydrogen. Although anolyte and catholyte composition are in this case identical, the circulation of the two outlet flows is maintained separate for the sake of maximising purity of products. In one embodiment, an anode for electrolytic evolution of oxygen is present inside the anodic compartment, consisting of a nickel substrate coated with films containing catalysts based on metal oxides, for instance pertaining to the family of spinels or perovskites.

The use of a cation-exchange membrane as separator, absolutely atypical in electrolysis of alkaline solutions, entails a further enhanced gas separation even at pressurised conditions, allowing operation with significant pressure differentials between one compartment to the other which contribute optimising the overall efficiency. On the other hand, the cell according to the invention also presents doubtless advantages with respect to PEM/SPE-type cells, since the presence of a highly conductive liquid electrolyte allows operating with less stringent constructive tolerances, compensating for the zones where local electrical contact is more critical. Furthermore, the most surprising aspect is that purity of hydrogen produced with the cell according to the invention is even higher than the one observed with PEM/SPE-type cells.

In one embodiment, the gas-diffusion cathode is provided with a more hydrophilic catalysed layer in direct contact with the membrane and a less hydrophilic external layer, suitable for favouring the release of the gaseous product. This can have the advantage of improving mass transport phenomena, allowing the liquid electrolyte to easily access catalytic sites and providing the gas with a preferential outlet path. The hydrophobic layer may also be non-catalysed. In one embodiment, the gas-diffusion cathode is activated, at least in the more hydrophilic layer, with a platinum-containing catalyst. Platinum is particularly suitable for cathodic hydrogen evolution from alkali solutions in terms of activity and stability; as an alternative, it is possible to use catalysts based on palladium or platinum/palladium mixtures.

In one embodiment, the cation-exchange membrane is a non-reinforced monolayer sulphonic membrane of the type commonly employed for fuel cell applications. Inventors observed that non-reinforced membranes even of reduced thickness, provided they are adequately supported by a suitable mechanical design, show high performances at the indicated process conditions even when operated with an alkaline electrolyte. This has the advantage of allowing the use of a type of membrane characterised by a reduced ohmic drop and a relatively moderate cost with respect to monolayer sulphonic membranes equipped with an internal reinforcement, typical of industrial applications with alkaline electrolytes and giving rise to significantly higher cell voltages. Similar are observed compared to anion-exchange membranes sometimes used in industrial applications, with the additional benefit of a much higher electrical efficiency and better properties in term of separation of anolyte and catholyte, with obvious consequences on purity of product hydrogen.

In one embodiment, the cathode and the cathodic wall are put in electrical contact by means of a current collector consisting of a porous metal structure, optionally a nickel or steel foam. This can have the advantage of establishing an electrical contact by densely distributed points along the whole surface of the cathode, which could have a rather low superficial conductivity when obtained from a carbonaceous substrate; at the same time, this kind of current collecting elements can guarantee an equally well distributed mechanical support at reduced mechanical loads, contributing to the protection of the cation-exchange membrane even in conditions of differential pressurisation between the two cell compartments.

In one embodiment, the anode for oxygen evolution consists of a substrate made of a nickel or steel mesh or expanded or punched sheet, optionally activated with a catalytic coating. Nickel and steel are materials typically used for cathodic compartments of industrial membrane electrolyzers; the particular conditions of electrolyte composition made possible by the cell design according to the invention allow their use also for the anodic compartment, simplifying the cell construction. In one embodiment, the anode for oxygen evolution is positioned in direct contact with the membrane, in order to eliminate the ohmic drop associated to the electrolyte inside the anode-to-membrane gap.

In one embodiment, the anode for oxygen evolution is put in electrical contact with the relevant anodic wall by means of a current collector consisting of a porous metal structure, optionally a nickel or steel foam, similarly to the collector disclosed for the cathode side, further contributing to an optimum mechanical support of the membrane/cathode package. The dimensioning of the anodic collector may be different from that of the cathodic collector, especially in terms of porosity and of density of contact points. An optimum dimensioning of the above described current collectors may allow positioning the anode in direct contact with the membrane, supporting the latter in an adequate way while substantially limiting the risk of punching or otherwise damaging the same, for instance by abrasion.

Under another aspect, the invention relates to an electrolyzer of alkaline solutions consisting of a modular arrangement of cells as hereinbefore described, electrically connected through the anodic and cathodic walls according to a bipolar or monopolar configuration, that is in series or in parallel.

Under another aspect, the invention relates to an electrolytic process comprising feeding an electrolyte consisting of an alkali metal hydroxide solution, such as caustic soda or potash, separately to the anodic and to the cathodic compartment of a cell as hereinbefore described; supplying direct electrical current upon connection of the cathodic compartment to the negative pole and of the anodic compartment to the positive pole of a rectifier or other direct power supply; withdrawing exhaust electrolyte containing dissolved oxygen from the anodic compartment and exhaust electrolyte containing dissolved hydrogen from the cathodic compartment.

In one embodiment, the process electrolyte consists of an aqueous solution of caustic soda at 8 to 45% by weight concentration, more preferably 10 to 20% by weight concentration. This can have the advantage of achieving an optimum process efficiency while adequately preserving integrity of the cation-exchange membrane.

Some implementations exemplifying the invention will now be described with reference to the attached drawing, which has the sole purpose of illustrating the reciprocal arrangement of the different elements relatively to said particular implementations of the invention; in particular, elements are not necessarily drawn to scale.

BRIEF DESCRIPTION OF THE FIGURES

The FIGURE shows a side sectional view of an electrolysis cell according to the invention.

DETAILED DESCRIPTION OF THE FIGURE

The FIGURE shows a side sectional view of an electrolysis cell subdivided by means of a cation-exchange membrane 100 into an anodic compartment and a cathodic compartment; the anodic compartment consists of a chamber delimited at the side opposite membrane 100 by an anodic wall 200; inside the anodic compartment, an anode 300 consisting of a substrate made of a mesh or other porous metal structure is present in direct contact with membrane 100 or spaced apart therefrom at most by a very small predefined gap, in the order of magnitude of a few millimetres. The electrical contact between anode 300 and the corresponding anodic wall 200 is achieved through an anodic current collector 600 consisting of a porous metal structure, for instance a nickel or steel foam or mat. The anodic compartment is equipped with feed 400 and discharge 401 means of process anolyte, for instance caustic soda or potash. The FIGURE shows electrolyte feed from the top and discharge from the bottom, but the cell may be operated also by feeding the electrolyte bottom up. At the anodic compartment, oxygen 500 is produced and discharged in form of bubbles within the electrolyte phase. The cathodic compartment consists of a chamber delimited at the side opposite membrane 100 by a cathodic wall 210; a cathode 310 consisting of a porous web provided with a layer 311 catalytically activated with platinum and/or palladium is arranged in intimate contact with membrane 100, for instance by hot pressing or other known technique. The cathode can also be provided with a second layer 312 consisting of carbon or metal powders and polymer binders adjacent the catalytically activated layer on the side opposite to the membrane and having less hydrophilic characteristics with respect to the catalytically activated layer. The electrical contact between cathode 310 and cathodic wall 210 is achieved through a cathodic current collector 610 consisting of a porous metal structure, preferably a nickel or steel foam. The cathodic compartment is equipped with feed 410 and discharge 411 means of process catholyte, which in one embodiment has the same composition of process anolyte but is separately circulated; the cathodic product consists of hydrogen 510 discharged as bubbles inside the electrolyte phase. The illustrated cell also comprises a gasketing system (not shown) and tightening means, for instance tie-rods distributed along the perimeter of the anodic and cathodic walls (not shown). It will be clear to a person skilled in the art how a multiplicity of cells as hereinbefore described is suitable for being employed as modular elements of an electrolyzer. By way of example, an electrolyzer in bipolar configuration, consisting of a stack of cells connected in electrical series, can be obtained by assembling the cells so that each of the intermediate cell walls acts at the same time as the anodic wall of one cell and as the cathodic wall of an adjacent cell, according to a filter-press design widely known in the art.

The following examples are included to demonstrate particular embodiments of the invention, whose practicability has been largely verified in the claimed range of values.

It should be appreciated by those of skill in the art that the compositions and techniques disclosed in the examples which follow represent compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

Example

Two electrolyzers were assembled, one comprised of eight and the other of four cells of the type illustrated in the FIGURE having an electrode area of 63 $cm^2$, mutually connected in electrical series and assembled in a filter-press bipolar configuration. The walls delimiting the different cell compartments were obtained out of a nickel sheet. As the anodic current collector, a nickel mat made of four layers of interlaced and superposed wires with an uncompressed thickness of 2 mm and as the cathodic current collector a 1 mm thick foam were used. The anodes were made of a nickel mesh activated with a thin layer of catalyst containing a mixtures of oxides of lanthanum, cobalt and nickel, assembled in intimate contact with the membrane. The cathode was made of a carbon cloth activated with a hydrophilic layer consisting of a 20% by weight platinum-based catalyst supported on high surface area carbon black, soaked with a Nafion® sulphonated perfluorinated ionomer dispersion from DuPont, deposited upon the carbon cloth by spraying, at a total Pt loading of 0.5 mg/$cm^2$. On the hydrophilic layer side opposite the membrane a hydrophobic layer was deposited also by spraying, obtained from a mixture of low surface area carbon black and PTFE, in a 1:1 weight proportion. The cathode was overlaid to a monolayer sulphonic Nafion® membrane manufactured by DuPont and cold-pressed under the effect of cell tightening. To reach equilibrium conditions sooner, inventors have also verified the possibility of hot pressing the cathode and the membrane previously to the cell assemblage.

The electrolyzers were operated in two test campaigns of 3000 hours, one on caustic potash and the other on caustic soda, varying electrolyte concentration (up to 45% by weight of alkali), current density (up to 9.5 kA/$m^2$) and cathodic pressure (1 to 2 bar absolute). In all tests, hydrogen of higher purity with respect to that typical of PEM/SPE pure water electrolyzers was produced. Performances in terms of cell voltage were completely aligned to the expectations also at atmospheric pressure and moderate electrolyte concentration: by operating with 20% caustic soda at atmospheric conditions and at an average temperature of 73° C. in both compartments for instance, a stable voltage of 1.92 V was obtained at 9.5 kA/$m^2$.

Purity of product hydrogen was determined in terms of concentration of oxygen in the dried cathodic product: the different tests gave values within the range 0.1-1 ppm of $O_2$.

Counterexample

A four cell electrolyzer was assembled similar to the one of the above example except for the replacement of the cathode with a nickel mesh activated with a 5 g/$m^2$ platinum galvanic coating, assembled in intimate contact with the membrane. The test campaign of the previous example was repeated operating at atmospheric pressure only, since pressurisation of cells with two metal meshes in contact with the two faces of the membrane was considered too hazardous for the integrity of the latter. By operating on 20% caustic soda at 73° C., a stable voltage of 2.34 V was obtained at 9.5 kA/$m^2$. The maximum hydrogen purity detected during this test campaign corresponded to 400 ppm of $O_2$ in the dried cathodic product.

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. An electrolysis cell comprising:
   a cation-exchange membrane,
   an anodic compartment,
   a cathodic compartment partitioned by the cation-exchange membrane, and
   an electrolyte consisting of an aqueous solution of caustic soda comprising 8-45% by weight of concentration,
   said anodic compartment consisting of a liquid chamber delimited by an anodic wall and by said cation-exchange membrane and filled with the electrolyte,
   said anodic compartment containing an anode suitable for oxygen evolution, the anode comprising a nickel mesh activated with a thin layer of catalyst containing a mixture of oxides of lanthanum, cobalt and nickel assembled in direct contact with said cation-exchange membrane, said anodic compartment further comprising a feeding inlet and a discharging outlet for discharging the electrolyte,
   said cathodic compartment delimited by a cathodic wall and by said cation-exchange membrane, said cathodic compartment containing a gas-diffusion cathode suitable for hydrogen evolution,
   the gas-diffusion cathode comprising a carbon cloth having a hydrophilic layer consisting of 20% by weight of a catalytically-activated layer consisting of platinum and/or palladium, supported on high surface area carbon black, soaked with sulphonated perfluorinated ionomer dispersion and deposited upon the carbon cloth, and in direct contact with said cation-exchange membrane, and
   said gas-diffusion cathode further comprising an external hydrophobic layer suitable for facilitating the release of hydrogen to the cathodic compartment, the hydrophobic layer being a mixture of low surface area carbon black and polytetrafluoroethylene (PTFE) in a 1:1 weight proportion,
   wherein a purity of product hydrogen determined in terms of concentration of oxygen in a dried cathodic product ranges between 0.1-1 ppm of $O_2$.

2. The electrolysis cell according to claim 1 wherein said cation-exchange membrane is a non-reinforced monolayer sulphonic membrane.

3. The electrolysis cell according to claim 1, wherein said catalytically-activated layer of said hydrophilic layer of the gas-diffusion cathode contains platinum.

4. The electrolysis cell according to claim 1, wherein said gas-diffusion cathode and said cathodic wall are put in electrical contact by means of a current collector consisting of a porous metal structure comprising distributed points of electrical contacts, wherein the porous metal structure is a nickel or steel foam.

5. The electrolysis cell according to claim 1, wherein said anode suitable for oxygen evolution and said anodic wall are put in electrical contact by means of a current collector consisting of a porous metal structure, wherein the porous metal structure is a nickel or steel foam or mat.

6. An electrolyzer of alkali solutions consisting of a modular arrangement of plural electrolysis cells according to claim 1, electrically connected through said anodic and cathodic walls according to a bipolar or monopolar configuration.

7. A process of electrolysis in the electrolysis cell according to claim 1 comprising the steps of:
   feeding the electrolyte consisting of the aqueous solution of caustic soda comprising 8-45% by weight of concentration to said anodic and cathodic compartments;
   connecting said cathodic compartment to a negative pole and said anodic compartment to a positive pole of a power unit, with subsequent supply of direct electrical current;
   carrying out cathodic evolution of hydrogen within said catalytically-activated layer and discharging said hydrogen from said cathodic compartment;
   carrying out evolution of oxygen on a surface of said anode; and
   obtaining the purity of product hydrogen determined in terms of concentration of oxygen in the dried cathodic product ranging between 0.1-1 ppm of $O_2$.

8. The process according to claim 7 wherein the aqueous solution of caustic soda is 10 to 20% by weight concentration.

* * * * *